United States Patent
Nakatsukasa

[11] Patent Number: 6,122,795
[45] Date of Patent: Sep. 26, 2000

[54] WIPER DEVICE

[75] Inventor: Tetsuya Nakatsukasa, Okazaki, Japan

[73] Assignee: ASMO Co., Ltd., Japan

[21] Appl. No.: 09/040,421

[22] Filed: Mar. 18, 1998

[30] Foreign Application Priority Data

Mar. 25, 1997 [JP] Japan ................................ 9-072117

[51] Int. Cl.[7] .................. B60S 1/32; B60S 1/34
[52] U.S. Cl. ................. 15/250.201; 15/250.351
[58] Field of Search ................. 15/250.351, 250.23, 15/250.32, 250.201, 250.21, 250.31, 250.361

[56] References Cited

U.S. PATENT DOCUMENTS

| | | | |
|---|---|---|---|
| 1,248,795 | 12/1917 | Beitman | 15/250.32 |
| 4,214,344 | 7/1980 | Kohler et al. | 15/250.351 |
| 5,729,861 | 3/1998 | Journee | 15/250.32 |
| 5,842,251 | 12/1998 | Le Francois et al. | 15/250.351 |

FOREIGN PATENT DOCUMENTS

| | | | |
|---|---|---|---|
| 1104253 | 6/1955 | France | 15/250.23 |
| 3744237 | 7/1989 | Germany | 15/250.351 |
| 63-79256 | 5/1988 | Japan . | |
| 2-80054 | 6/1990 | Japan . | |
| 9-142261 | 6/1997 | Japan . | |
| 9-164917 | 6/1997 | Japan . | |
| 610697 | 6/1978 | Russian Federation | 15/250.351 |

*Primary Examiner*—Gary K. Graham
*Attorney, Agent, or Firm*—Parkhurst & Wendell, L.L.P.

[57] ABSTRACT

A wiper device including a drive shaft which reciprocates pivotally, a wiper arm fixed to the drive shaft and reciprocating pivotally together with the drive shaft, and a wiper blade connected to the wiper arm at a connecting portion and moving with the reciprocating pivotal movement of the wiper arm to wipe a surface to be wiped, at least one portion of the wiper arm being positioned above the wiper blade in overlapping manner in plan view, the wiper device comprising vibration limiting means which is provided at any one of the wiper blade and the wiper arm at a position other than the portion where the wiper blade and the wiper arm are connected in a range where the wiper blade and the wiper arm overlap with each other and which limits relative vibration of the wiper arm and the wiper blade during the reciprocating pivotal movement.

23 Claims, 14 Drawing Sheets

WIPER DEVICE

BACKGROUND OF THE INVENTION

1. Field of the Invention

The present invention relates to a wiper device which wipes a glass surface such as a windshield glass of a vehicle.

2. Description of the Related Art

There has been known, as disclosed in Japanese Utility Model Application Laid-Open (JP-U) No. 63-79256, a wiper arm that is connected to a wiper blade in such a manner as to be disposed at the side of the wiper blade and a connecting member formed at one end portion of the wiper blade and projecting at the side of the wiper blade in the transverse direction of the wiper blade and used to connect the wiper arm with the wiper blade. For this reason, when the wiper blade moves slidingly on a windshield glass surface, deflection of a longitudinal-direction end portion of the wiper blade toward the windshield glass surface around a portion where the wiper arm and the wiper blade are connected is prevented. However, since the wiper device is formed to have the above-described structure, the visual field of an occupant of a vehicle is limited in a wide range.

Further, as another example of a wide device, there has been known, as disclosed in Japanese Utility Model Application Laid-Open (JP-U) No. 2-80054, a pantographic wiper device in which the position of a wiper blade is changed in such a manner that the wiper blade is moved slidingly on a windshield glass surface by using a quadric linking mechanism including a main arm and a sub-arm.

On the other hand, in this type of pantographic wiper device, each end portion of the main arm and the sub-arm is connected to the wiper blade at the central portion of the wiper blade. For this reason, there is a possibility that a leading end and a rear end of the wiper blade deflect toward the windshield glass surface around the portion where each arm is connected to the wiper blade during pivotal movement of the wiper blade due to backlash generated by connection of each arm to the wiper blade, or the like. Moreover, this pantographic wiper device is provided with the sub-arm to maintain the wiping position of the wiper blade, and therefore, the visual field of an occupant of a vehicle is limited in a wide range.

SUMMARY OF THE INVENTION

In view of the above-described circumstances, it is an object of the present invention to provide a wiper device which can control the deflection of wiper blades.

A first aspect of the present invention is a wiper device including a drive shaft which reciprocates pivotally, a wiper arm fixed to the drive shaft and reciprocating pivotally together with the drive shaft, and a wiper blade connected to the wiper arm at a connecting portion and moving with the reciprocating pivotal movement of the wiper arm to wipe a surface to be wiped, at least one portion of the wiper arm being positioned above the wiper blade in overlapping manner in plan view, the wiper device comprising: vibration limiting means which is provided at any one of the wiper blade and the wiper arm at a position other than the portion where the wiper blade and the wiper arm are connected in a range where the wiper blade and the wiper arm overlap with each other and which limits relative vibration of the wiper arm and the wiper blade during the reciprocating pivotal movement.

A second aspect of the present invention is a wiper device in which the vibration limiting means has a pair of side walls which faces the wiper blade at both sides of the wiper blade in the transverse direction.

According to the first aspect of the present invention, the vibration limiting means is provided in a portion where the wiper blade and the wiper arm overlap with each other at a position other than the portion where the wiper blade and the wiper arm are connected and limits relative vibration of the wiper arm and the wiper blade during the reciprocating pivotal movement. For this reason, the vibration of the wiper blade during the reciprocating pivotal movement of the wiper device is limited by the vibration limiting means.

According to the second aspect of the present invention, the vibration limiting means includes a pair of side walls which face each other via the wiper blade at both ends of the wiper blade in the transverse direction. As described above, even if the wiper blade vibrates, an amount of relative movement of the wiper blade to the wiper arm is limited by the side walls provided at both sides of the wiper blade in the transverse direction, with the result that the vibration of the wiper blade is restrained.

As described above, the wiper device according to the present invention can limit the vibration of the wiper blade during pivotal movement.

DESCRIPTION OF THE PREFERRED EMBODIMENTS

Figure 1:
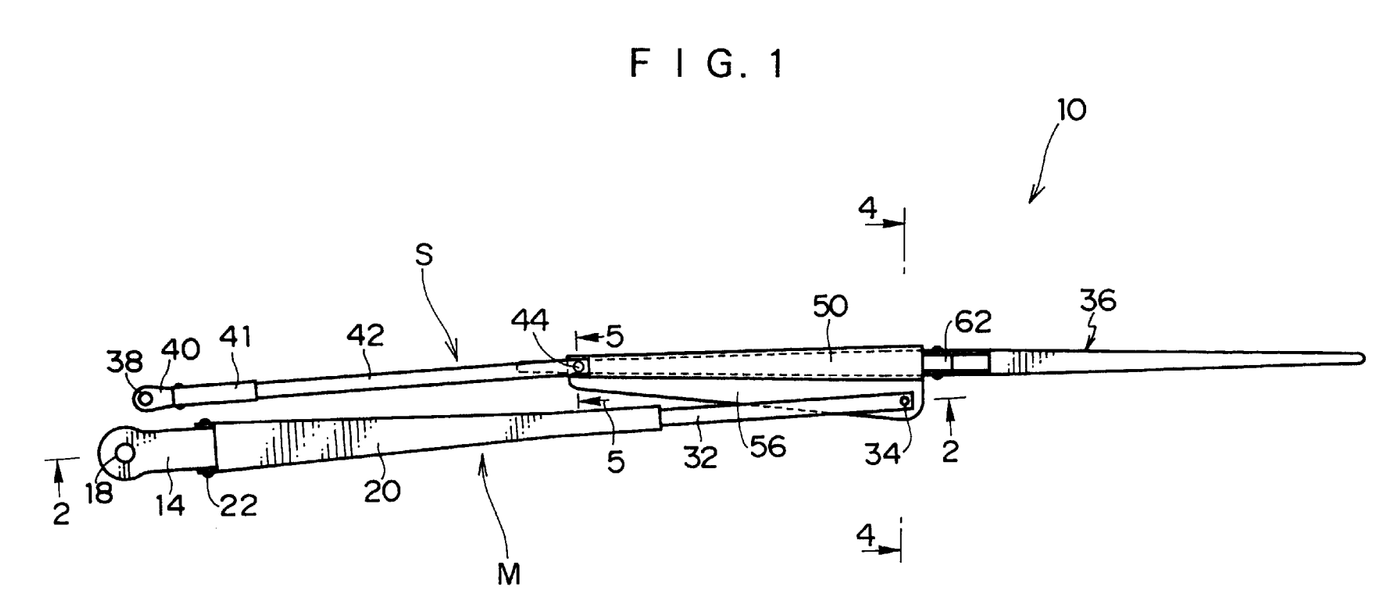
FIG. 1 is a plan view of a pantographic wiper device according to a first embodiment of the present invention.

FIG. 1 shows a plan view of a wiper device 10 according to a first embodiment of the present invention. As shown in this drawing, the wiper device 10 is disposed in such a manner that the longitudinal direction thereof coincides with the radial direction of a pivot shaft 18 disposed at the lower end portion of a windshield glass 16 (see FIG. 6) and serving as a driving shaft. The wiper device 10 also has an arm head 14 of which the base end portion is fixed to the pivot shaft 18. The arm head 14 is connected to a wiper motor (not shown), which is provided as a driving means installed in the vehicle, via the pivot shaft 18 and transmission means such as a connecting rod (not shown) and is also provided to integrally rotate around the pivot shaft 18 due to driving force of the wiper motor.

Further, a main arm 20 is provided at the end portion of the arm head 14. The longitudinal direction of the main arm 20 coincides with the radial direction of the pivot shaft 18 in the same way as in the arm head 14 and the cross section of the main arm 20 in the direction perpendicular to the longitudinal direction is formed substantially in the U-shaped configuration having an opening toward the windshield glass 16 (see FIG. 6), i.e., in the direction indicated by arrow Y in FIG. 2. The end portion of the main arm 20 toward the pivot shaft 18 is connected to the end portion of the arm head 14 by fastening means such as a rivet 22 and the main arm 20 is provided to be pivotable by a predetermined angle in the directions where the main arm 20 moves close to and away from the windshield glass 16 (i.e., the direction indicated by arrow Y in FIG. 2 and the direction opposite thereto).

Figure 2:
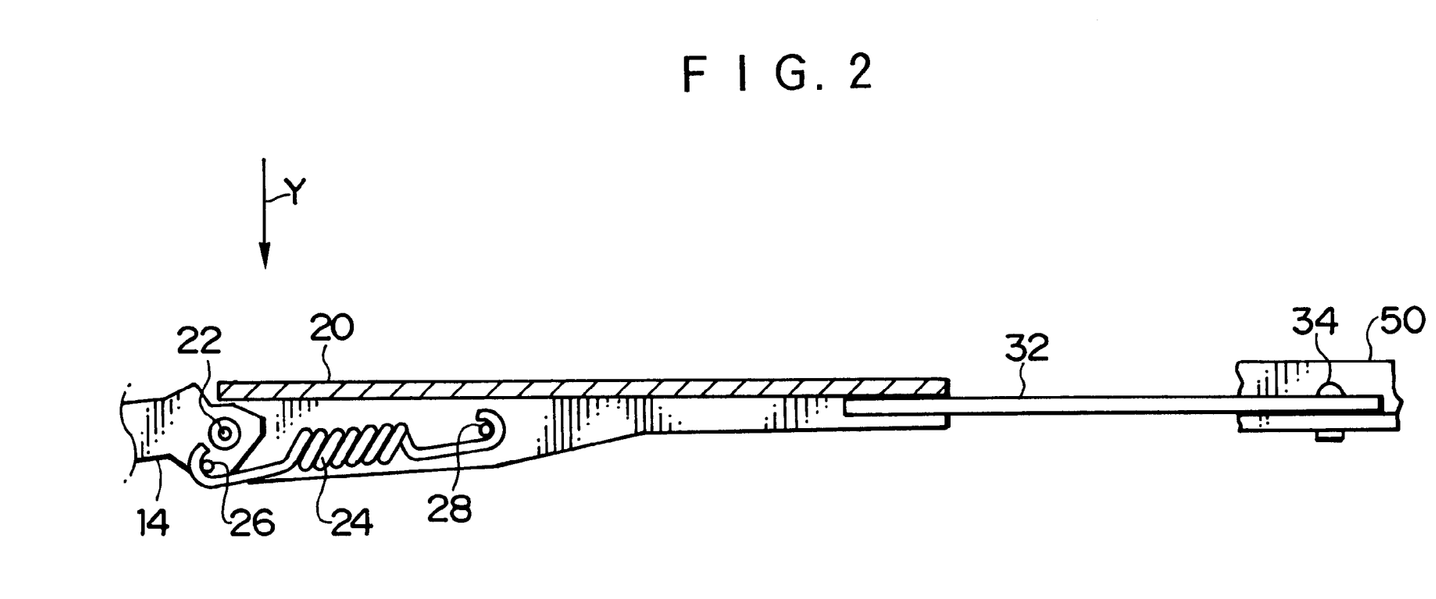
FIG. 2 is a cross-sectional view taken along the line 2—2 in FIG. 1.

As shown in FIG. 2, an extension coil spring 24 is provided within the main arm 20 (i.e., at the side of the windshield glass 16). One end of the extension coil spring 24 is engaged with an engaging pin 26 provided at the end portion of the arm head 14 and the other end thereof is engaged with an engaging pin 28 provided within the main arm 20, and therefore, the main arm 20 is constantly urged toward the windshield glass 16 (i.e., in the direction indicated by arrow Y in FIG. 2).

An arm piece 32 having the shape of a narrow plate is fixed to the end of the main arm 20 and the longitudinal direction thereof coincides with the radial direction of the pivot shaft 18 in the same way as in the main arm 20. The end of the arm piece 32 is connected to a stay 50 by a rivet 34 in such a manner as to be rotatable around the rivet 34 and is further connected via the stay 50 to a wiper blade 36 of which longitudinal direction coincides with the substantially radial direction of the pivot shaft 18.

Figure 6:
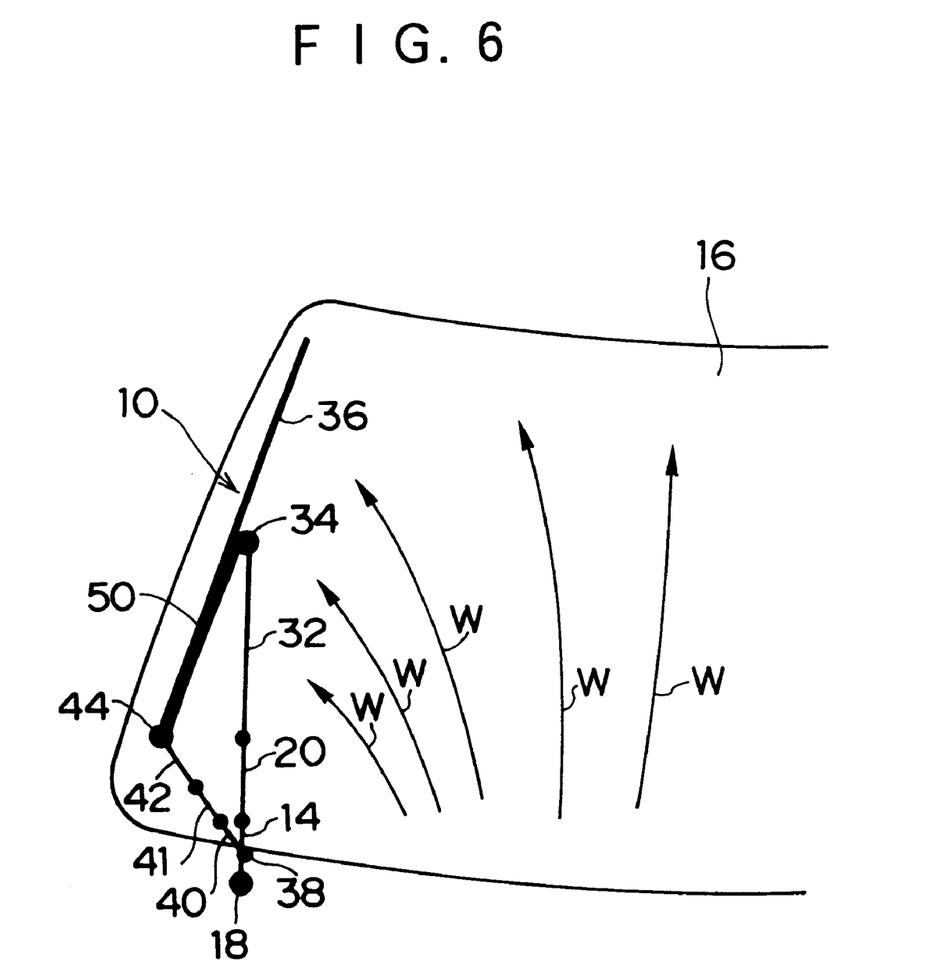
FIG. 6 is a schematic view which shows an overall construction of the pantographic wiper device according to the first embodiment of the present invention.

On the other hand, as shown in FIG. 6, a pivot shaft 38 serving as a supporting shaft is provided between the pivot shaft 18 and the windshield glass 16. As shown in FIG. 1, the base end portion of the arm head 40 is fixed to the pivot shaft 38 and the arm head 40 is provided to be rotatable together with and around the pivot shaft 38.

A sub-arm 41 whose longitudinal direction coincides with the radial direction of the pivot shaft 38 is connected to the end of the arm head 40 by fastening means such as the rivet 34 in the same way as in the main arm 20 in such a manner as to be rotatable by a predetermined angle in directions where the sub-arm 41 moves close to and away from the windshield glass 16.

A narrow plate-shaped sub-arm piece 42 of which longitudinal direction coincides with the radial direction of the pivot shaft 38 is fixed to the end of the sub-arm 41. The end of the sub-arm piece 42 is connected by a rivet 44 to the stay 50 in such a manner as to be pivotable around the rivet 44 and is further connected to the wiper blade 36 via the stay 50.

Figure 3:
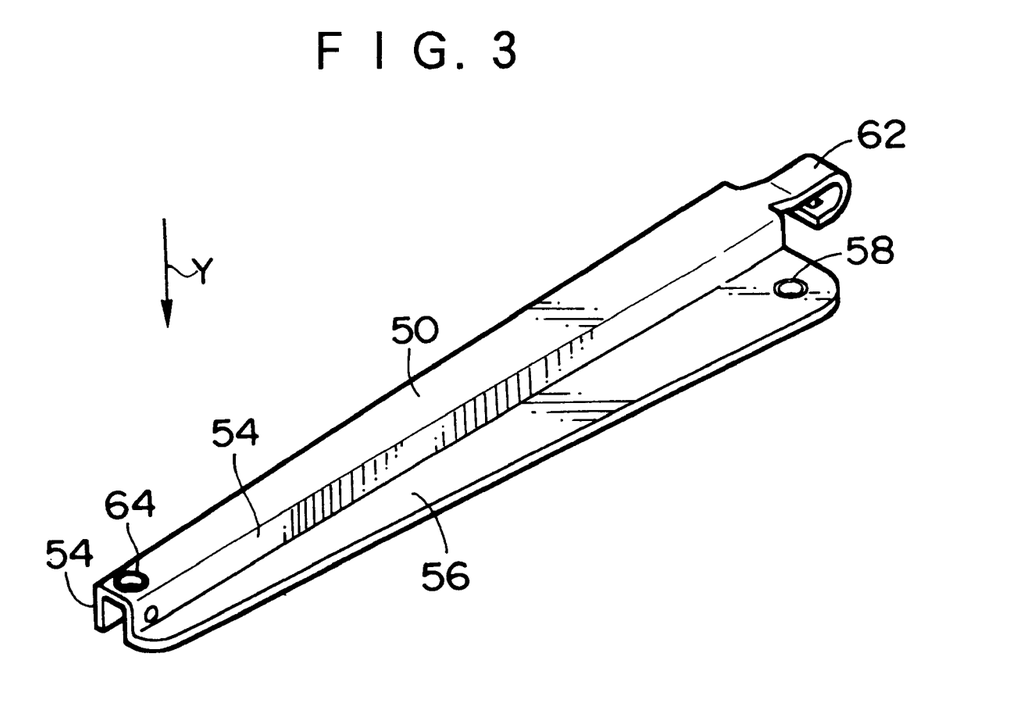
FIG. 3 is a perspective view of vibration limiting means.

FIG. 3 shows a perspective view of the stay 50. As shown in FIGS. 1 and 3, the stay 50 is formed integrally in such a manner that the longitudinal direction thereof coincides with that of the wiper blade 36 by casting or sintering such as a lost wax process in the case in which the stay 50 is made of metal, or by an injection molding process or the like in the case in which the stay 50 is made of a synthetic resin material. The overall length of the stay 50 is approximately half that of the wiper blade 36 and the stay 50 faces the wiper blade 36 (in an overlapping manner) in the range from the intermediate portion of the wiper blade 36 in the longitudinal direction to the end of the wiper blade 36 toward the pivot shaft 38.

Figure 4:
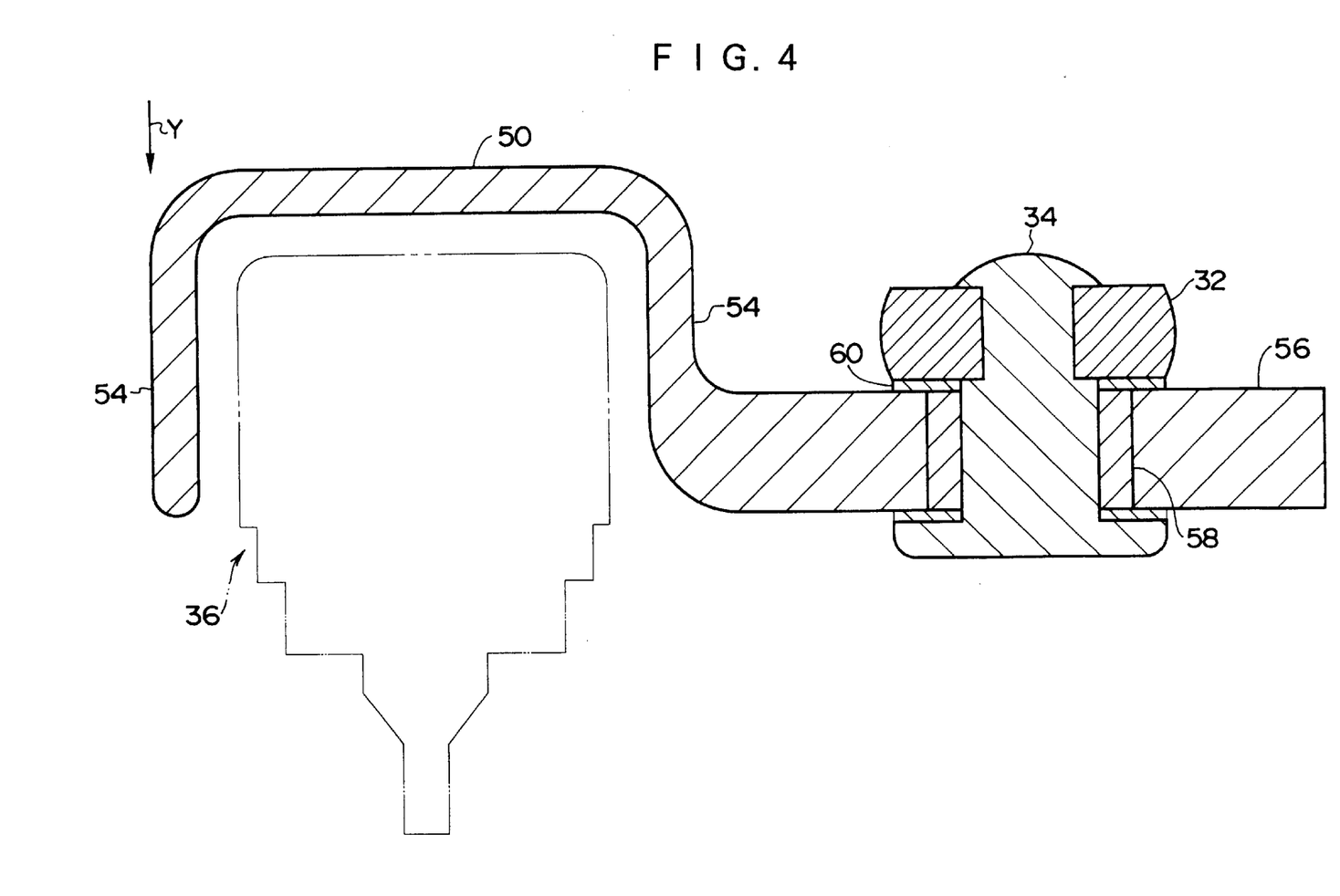
FIG. 4 is a cross-sectional view taken along the line 4—4 in FIG. 1.
Figure 5:
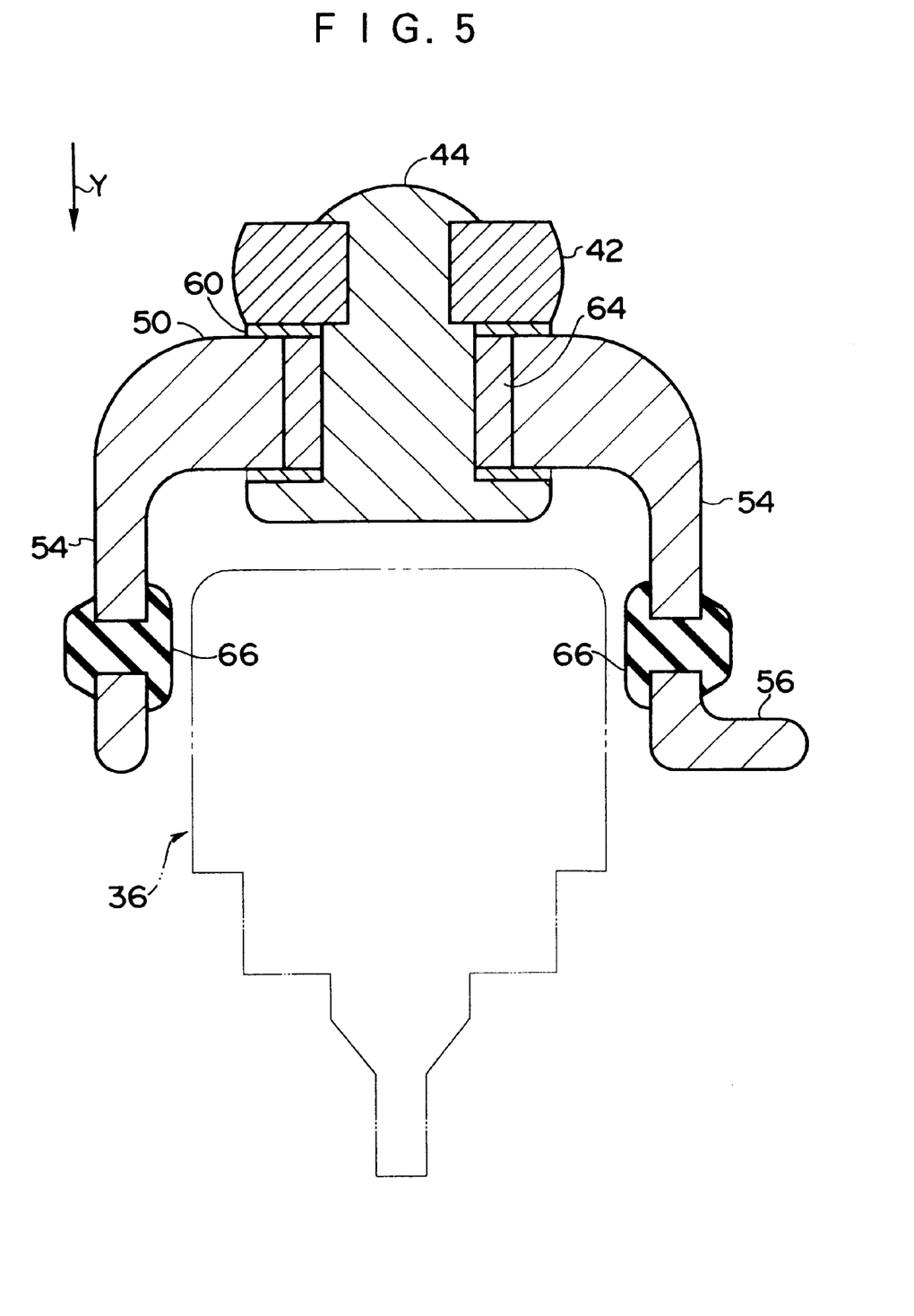
FIG. 5 is a cross-sectional view taken along the line 5—5 in FIG. 1.

FIG. 4 is a cross-sectional view of the stay 50 taken along the line 4—4 in FIG. 1, and FIG. 5 is a cross-sectional view of the stay 50 taken along the line 5—5 in FIG. 1. As shown in these drawings, both end portions of the stay 50 in the transverse direction each extend toward the wiper blade 36 to form side walls 54. The stay 50 has a substantially U-shaped cross-sectional configuration taken along the line perpendicular to the longitudinal direction of the stay 50 with an opening provided toward the wiper blade 36. The side walls 54 cover the wiper blade 36 in such a manner as to be disposed near both ends of the wiper blade 36 in the transverse direction from the side opposite to the windshield glass 16 with the wiper blade 36 interposed therebetween (i.e., from the side opposite to the direction indicated by arrow Y in FIGS. 4 and 5).

Further, a flange portion 56 is formed from the end portion of one of the side walls 54 of the stay 50 at the side of the windshield glass 16 (i.e., at the side of the direction indicated by arrow Y in FIGS. 4 and 5) in such a manner as to extend toward the opposite side with respect to the other side wall 54. The flange portion 56 is formed in the shape of a triangle whose transverse dimension gradually increases toward the intermediate portion of the wiper blade 36 in the longitudinal direction in the state in which the stay 50 and the wiper blade 36 are connected to each other. A cylindrical bearing 58 is provided at the end portion of the flange portion 56 disposed toward the center of the wiper blade 36 in the longitudinal direction in such a manner as to pass through the flange portion 56. The rivet 34 passing through the end portion of the arm piece 32 is caulked to be fixed in a state of passing through the bearing 58. A thrust washer 60 is provided between the end portion of the arm piece 32 and the flange portion 56 of the stay 50 and the rivet 34 also passes through the thrust washer 60. For this reason, as compared with the case in which no thrust washer 60 is provided, the arm piece 32 can smoothly pivot around the rivet 34 with respect to the stay 50. Meanwhile, in the present embodiment, although the thrust washer 60 is used, a wave washer may be used in place of the thrust washer 60.

As shown in FIG. 3, a substantially U-shaped bent hook portion 62 is formed at the end portion of the stay 50, which is positioned at the intermediate portion of the wiper blade 36 in the longitudinal direction and a connecting member (not shown) of the wiper blade 36 is mounted at the hook portion 62.

On the other hand, as shown in FIG. 5, a bearing 64 which is similar to the bearing 58 (see FIG. 4) is provided at the end portion of the stay 50 at the side of the pivot shaft 38 in such a manner as to pass through the stay 50. The rivet 44 passing through the end portion of the sub-arm piece 42 is caulked to be fixed in such a manner as to pass through the bearing 64. Meanwhile, the thrust washer 60 is also provided at the position where the sub-arm piece 42 and the stay 50 are connected and the sub-arm piece 42 is provided to be smoothly pivotable around the rivet 44.

As described above, the arm head 14, the main arm 20, the arm piece 32, the stay 50, the sub-arm piece 42, the sub-arm 41, and the arm head 40 form a link mechanism. When the pivot shaft 18 rotates to allow pivotal movement of the arm head 14, the pivot shaft 38 is provided to pivot via the main arm 20, the arm piece 32, the stay 50, the sub-arm piece 42, the sub-arm 41, and the arm head 40.

Stoppers 66 are respectively provided for the side walls 54 at the end portions of the stay 50 at the side of the pivot shaft 38 and are each formed by load absorbing material, for example, rubber material and resin material. These stoppers 66 are fixed in such a manner as to pass through the side walls 54 and allows absorption of impact caused when the wiper blade 36 abuts against these stoppers 66.

Next, an operation of the first embodiment of the present invention will be described.

As illustrated by the schematic diagram shown in FIG. 6, in the wiper device 10 of the present invention, when the pivot shaft 18 rotates due to driving force of a wiper motor (not shown), the arm head 14 pivots, and synchronously with the pivotal movement, the wiper blade 36 reciprocates pivotally around the pivot shaft 18 on the windshield glass 16 via the main arm 20, the arm piece 32, and the stay 50. As a result, the windshield glass 16 is wiped by the wiper blade 36.

Further, as shown in FIG. 6, when the wiper blade 36 moves close to a position where the wiper blade 36 is reversed at the location which is nearest the end portion of the windshield glass 16 in the transverse direction (i.e., an upper reversed position), the wiper blade 36 moves to the upper reversed position together with a main wiper arm M which pivots around the pivot shaft 18. However, one end of a sub-wiper arm S is connected to the pivot shaft 38 provided to be pivotable at a position of the main wiper arm M other than the pivot shaft 18 and the other end of the sub-wiper arm S is connected via the stay 50 to the wiper blade 36 at the position other than the main wiper arm M. Accordingly, the sub-wiper arm S driven with pivotal movement of the main wiper arm M controls the wiping position of the wiper blade 36 in accordance with the wiping angle, and at the upper reversed position, the wiper blade 36 is moved substantially parallel to the end portion of the windshield glass 16 in the transverse direction (i.e., a window frame). As a result, the windshield glass 16 is wiped by the wiper blade 36 to the position which is extremely in the vicinity of the end portion of the windshield glass 16 in the transverse direction.

Here, when the wiper blade 36 reciprocates pivotally on the windshield glass 16, both ends of the wiper blade 36 in the longitudinal direction may vibrate around the portion, at which the hook portion 62 of the stay 50 is connected to the wiper blade 36, in the direction parallel to the glass surface of the windshield glass 16. However, in the wiper device 10 of the present invention, the wiper blade 36 is covered by the stay 50 in the state in which the side walls 54 of the stay 50 are disposed close to the wiper blade 36. For this reason, the wiper blade 36 can merely vibrate until the end portion of the wiper blade 36 on the side of the pivot shaft 38 abuts against the side walls 54. Further, the wiper blade 36 vibrates around the center thereof in the longitudinal direction, and therefore, the amplitude of vibration becomes maximum at both end portions of the wiper blade 36 in the longitudinal direction. However, the vibration of the end portion of the wiper blade 36 toward the pivot shaft 38 is restrained by the side walls 54, thereby making it possible to effectively limit the vibration.

Further, even if the stay 50 is about to vibrate together with the wiper blade 36, the stay 50 is pivotably connected to and supported by the sub-arm piece 42 at the side of one end of the wiper blade 36 in the longitudinal direction (i.e., at the side of the pivot shaft 38), and therefore, the vibration of the stay 50 itself is restrained by the sub-arm piece 42 (i.e., the sub-arm 41). For this reason, the vibration of the wiper blade 36 can be effectively limited.

Moreover, when the wiper blade 36 vibrates to abut against the side walls 54, the stoppers 66 abut against the wiper blade 36 to allow absorption of impact when abutting. For this reason, even when the wiper blade 36 abuts against the side walls 54, no abnormal sound is generated. Further, durability of the wiper blade 36 is improved.

Figure 7:
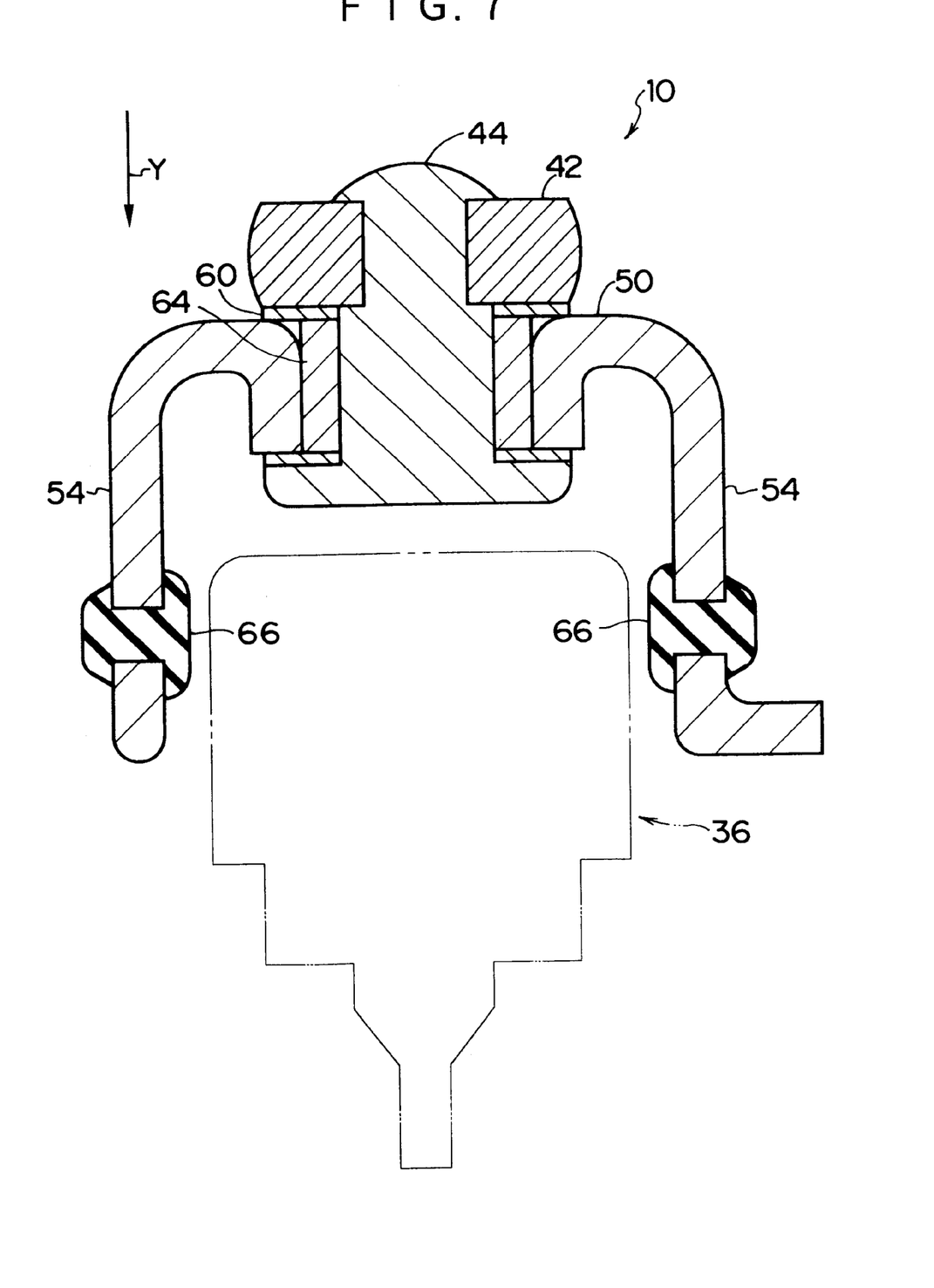
FIG. 7 is a cross-sectional view corresponding to FIG. 5, which shows a modified example of the pantographic wiper device according to the first embodiment of the present invention.

Meanwhile, in the present embodiment, the stay 50 is formed integrally by using a casting process, a sintering process, or an injection molding process, but the stay 50 may not also be formed as such an integrally molded member. For example, as shown in FIG. 7, a stainless steel plate or an iron plate may also be formed by using a burring process.

Next, a second embodiment of the present invention will be described. It should be noted that the same members as those of the first embodiment will be denoted by the same reference numerals, and a description thereof will be omitted.

Figure 8:
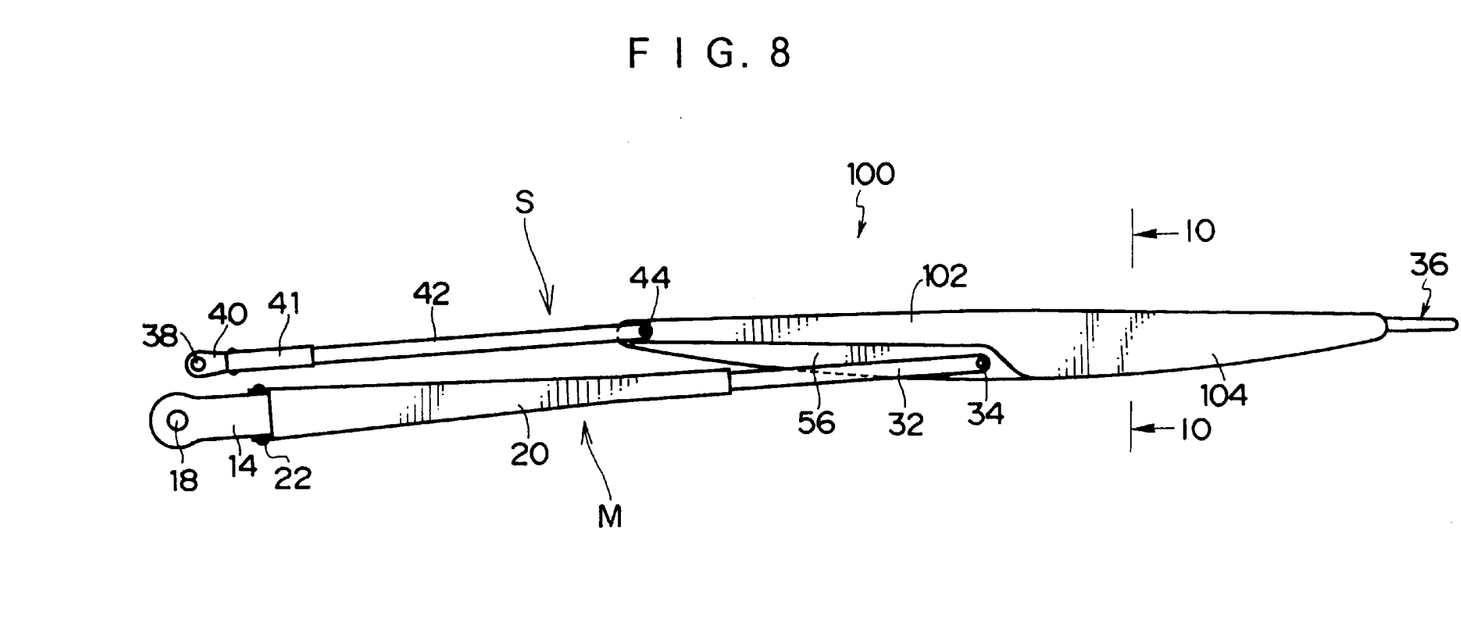
FIG. 8 is a plan view of a pantographic wiper device according to a second embodiment of the present invention.
Figure 9:
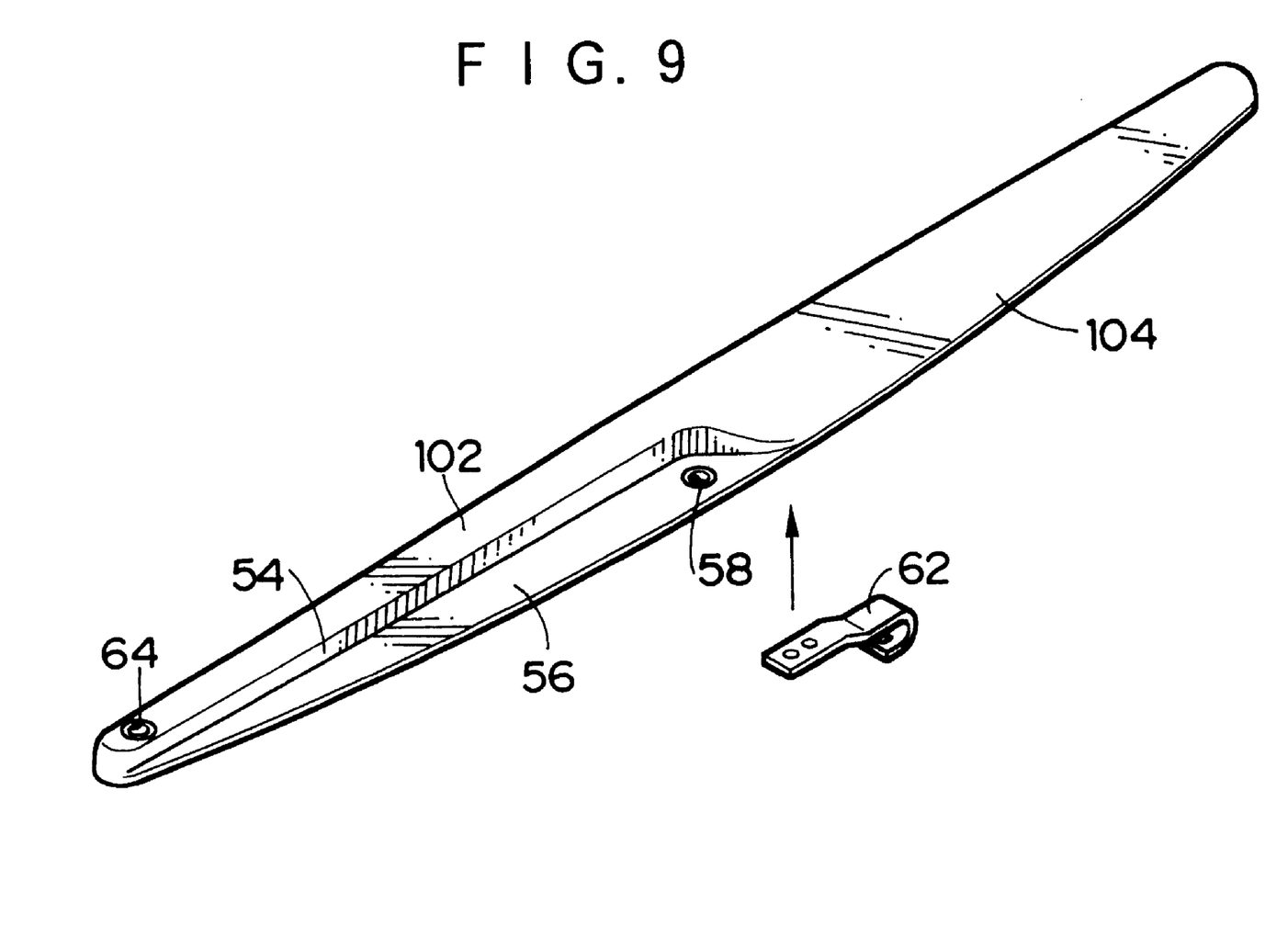
FIG. 9 is a perspective view of vibration limiting means.

FIG. 8 shows a plan view of a pantographic wiper device 100 according to the second embodiment (which will be hereinafter referred to merely as "wiper device 100"), and FIG. 9 shows a perspective view of a stay 102 applied to the wiper device 100. Namely, the wiper device 100 according to the second embodiment is different from the wiper device 10 according to the first embodiment in the structure of the stay 102.

The stay 102 is constructed in such a manner that, different from the stay 50 of the wiper device 10 according to the first embodiment, the hook portion 62 is formed separately from the stay 102 and is fixed by fastening means such as a rivet to the stay 102. Further, the stay 102 extends further toward the end of the wiper blade 36 in the longitudinal direction (i.e., at the opposite side with respect to the pivot shaft 38) than the intermediate portion and the extending portion of the stay 102 is formed as a fin 104.

Figure 10:
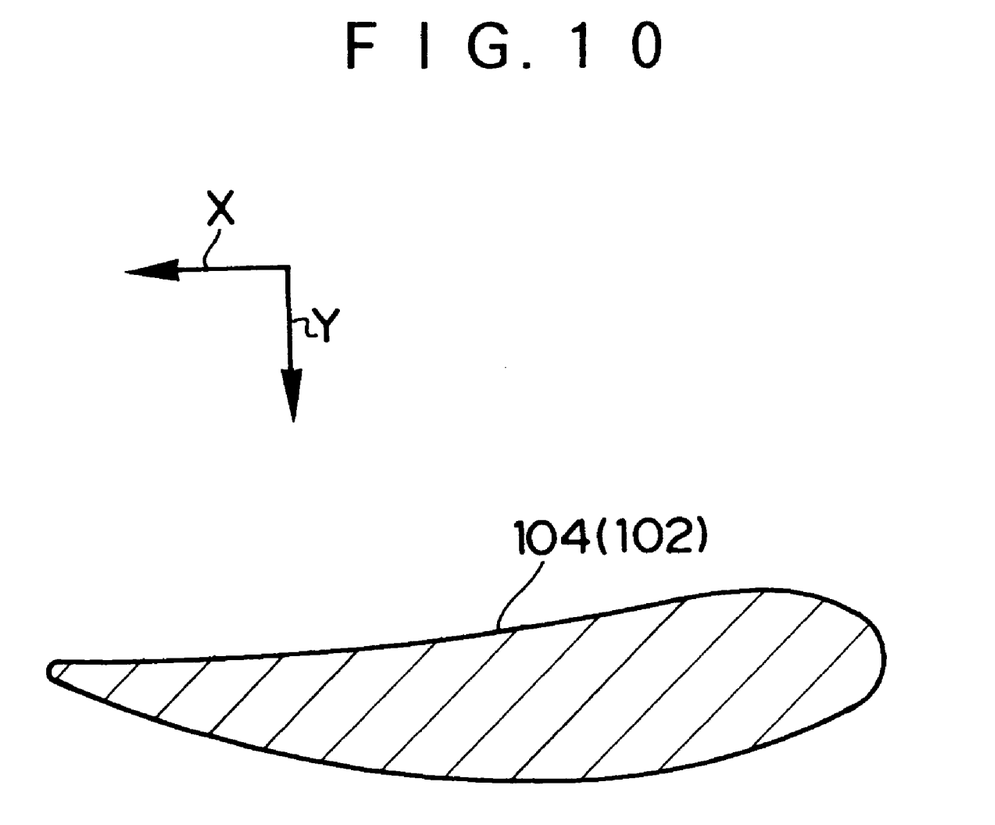
FIG. 10 is a cross-sectional view of a fin taken along the line 10—10 in FIG. 8.

FIG. 10 shows a cross-sectional view of the fin 104. As shown in FIG. 10, the fin 104 is provided with no side wall 54 and is bent smoothly so that both end surfaces thereof in the direction of thickness is formed to have a concave portion at the opposite side with respect to the windshield glass 16 (see FIG. 6), i.e., in the direction indicated by arrow Y in FIG. 10. Further, in the state in which the wiper blade 36 reaches the upper reversed position and is disposed at the position extremely near one end portion of the windshield glass 16 in the transverse direction (see FIG. 6), the fin 104 is formed to have a so-called Joukowski profile in which the end portion of the fin 104 in the transverse direction (at the side of the direction indicated by arrow X in FIG. 10), which is disposed at the opposite side with respect to the end portion of the windshield glass 16 in the transverse direction, is formed to have an acute-angled portion. Meanwhile, the Joukowski profile mentioned herein is used as that in a wide meaning, and includes Karman-Trefftz profile, von Mises profile, and the like.

In this state, when the vehicle is traveling, air flow W (see FIG. 6) runs along the glass surface of the windshield glass 16 from the lower side of the windshield glass 16 to the side portion of the vehicle. When the pressure of air flow W is applied to the fin 104, down force is generated which causes the fin 104 toward the windshield glass 16, and the wiper blade 36 is pressed against the windshield glass 16 via the fin 104 (and the stay 102). As a result, the wiping ability of the wiper blade 36 improves.

At this time, in the wiper device 100 of the present embodiment, the wiping position of the wiper blade 36 is changed by the sub-arm 41 and the sub-arm piece 42 during the rotation of the wiper blade 36 so that the wiper blade 36 is disposed parallel to one end of the windshield glass 16 in the transverse direction. When the wiping position of the wiper blade 36 is changed, even if the wiper blade 36 moves close to one end of the windshield glass 16 in the transverse direction, the fin 104 is disposed perpendicular to air flow W, thereby resulting in effective utilization of pressure of air flow W.

Figure 11:
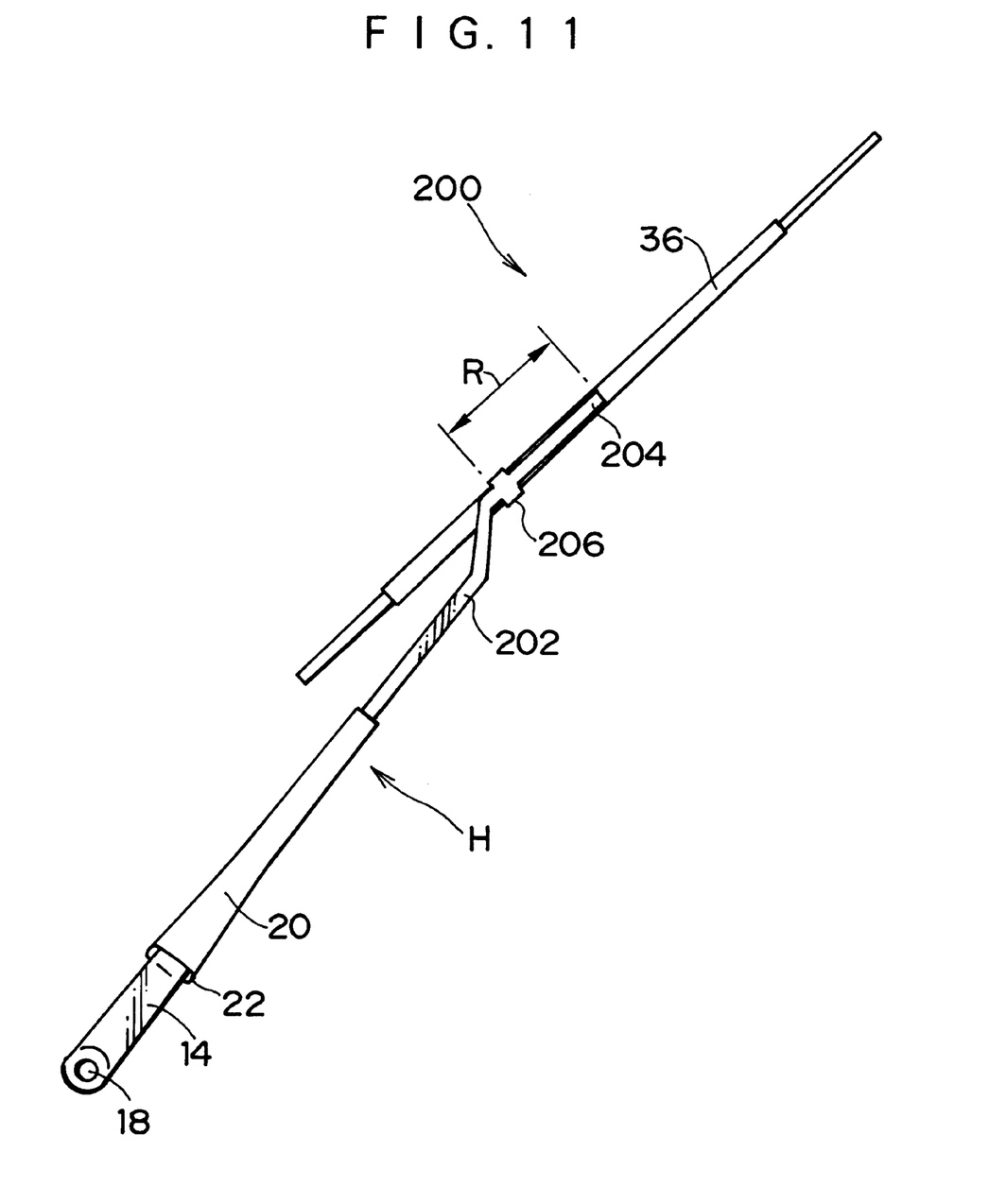
FIG. 11 is a plan view of a wiper device according to a third embodiment of the present invention.

Next, a wiper device 200 according to a third embodiment of the present invention will be described. FIG. 11 shows a plan view of the wiper device 200. It should be noted that the basically same portions as those of the first embodiment will be denoted by the same reference numerals, and a description thereof will be omitted.

The wiper device 200 according to the third embodiment is not a pantographic wiper device unlike each of the above-described embodiments. Further, the third embodiment is different from each of the other embodiments in that a portion corresponding to the stay of each of the above-described embodiments is formed integrally with an arm piece.

Figure 12:
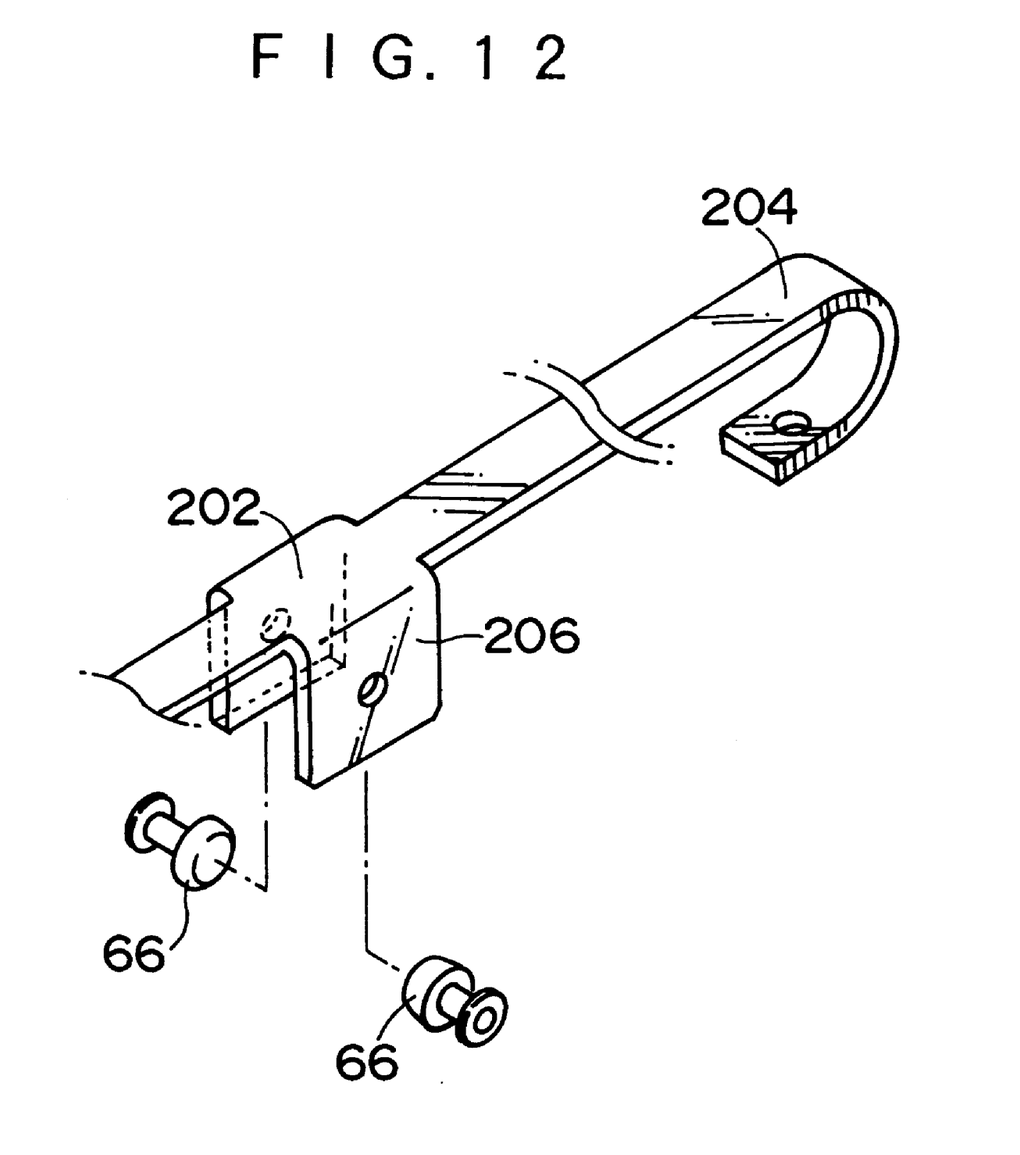
FIG. 12 is an enlarged perspective view of a principal portion of an arm piece according to the third embodiment of the present invention.

The intermediate portion of an arm piece 202 in the longitudinal direction is bent in the transverse direction of the arm piece 202 so that the longitudinal direction of the wiper blade 36 mounted at a hook portion 204 is brought into a state of being substantially parallel to the longitudinal direction of the main arm 20. In FIG. 11, side walls 206 serving as vibration limiting means are provided in a portion R of the arm piece 202 with the arm piece 202 and the wiper blade 36 overlapping with each other and at a position at the side of the pivot shaft 18 other than the portion where the wiper blade 36 is connected to the hook portion 204. For this reason, relative movement of the wiper blade 36 and a wiper arm formed by the main arm 20 and the arm head 14 with the portion at which the hook portion 204 of the arm piece 202 and the wiper blade 36 are connected serving as a pivotal center is limited during reciprocating pivotal movement of the wiper blade 36. Further, as shown in FIG. 12, the side walls 206 are each provided with the stopper 66 in the same way as in the first embodiment. These stoppers 66 each have the same operational effect as that of the first embodiment. Meanwhile, the wiper device 200 of the third embodiment has a tree structure formed from a plurality of lever members and a blade rubber is mounted at each of ends of the lever positioned at the final end portion.

In the third embodiment, the same operation and effect as those of the other embodiments can be obtained, and further, the visual field of an occupant of a vehicle can be expanded.

Figure 13:
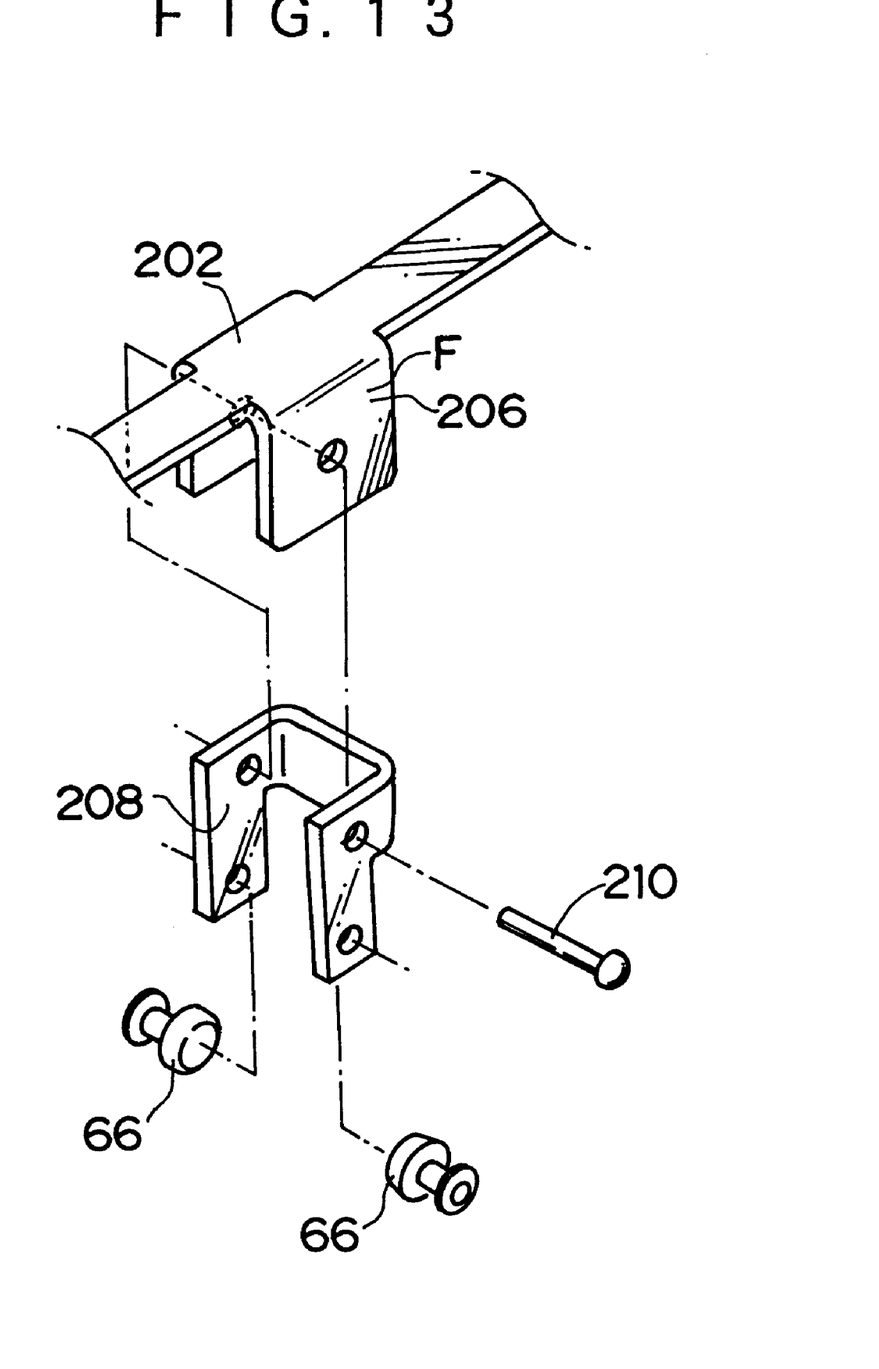
FIG. 13 is an enlarged perspective view of a principal portion, which shows another embodiment of vibration limiting means according to the third embodiment of the present invention.
Figure 14:
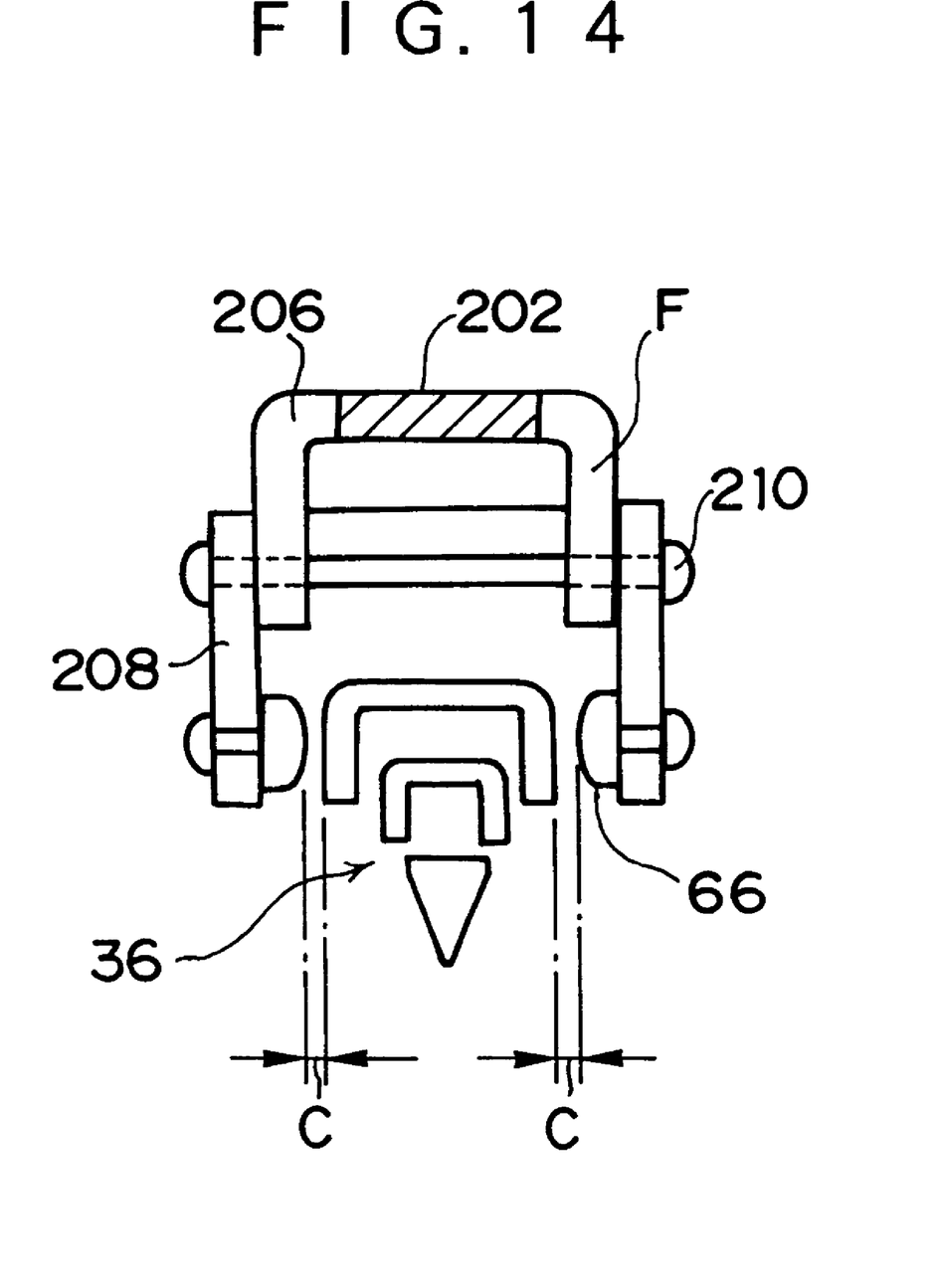
FIG. 14 is a side view which shows the state in which the arm piece shown in FIG. 13 and a connecting member are assembled.

In the third embodiment, the relative movement of the wiper arm and the wiper blade 36 is limited by the side walls 206 formed in the arm piece 202, but the present invention is not limited to the same. As shown in FIGS. 13 and 14, a connecting member 208 is connected by a pin 210 to the side walls 206 formed in the arm piece 202. When the connecting member 208 pivots as the need arises, so as to restrain the relative movement of the wiper blade 36 and the wiper arm H, clearance C is formed between the wiper blade 36 and each of the side walls 206, thereby making it possible to limit the relative movement of the wiper blade 36 and the wiper arm in a predetermined range. Further, the connecting member 208 may be pivotably connected to the wiper blade 36. Meanwhile, the structure shown in FIGS. 13 and 14 is not limited to the third embodiment, and is also applied to the first and second embodiments.

What is claimed is:

1. A wiper device comprising a drive shaft that reciprocates pivotally, a wiper arm fixed to the drive shaft and reciprocating together with the drive shaft, and a wiper blade connected to the wiper arm by a connecting portion that moves with the reciprocating pivotal movement of the wiper arm to wipe a surface to be wiped, at least one portion of the wiper arm being positioned above the wiper blade in an overlapping manner in relation to said surface to be wiped, said wiper device further comprising:

vibration limiting means that is pivotably provided in one of the wiper blade and the wiper arm so that relative vibration can be limited alternatively with respect to the other of the wiper blade and the wiper arm at a position other than the portion where the wiper blade and the wiper arm are connected in a range where the wiper blade and the wiper arm overlap with each other and that limits, within a predetermined clearance range, relative vibration of the wiper arm and the wiper blade during the reciprocating pivotal movement.

2. A wiper device according to claim 1, wherein said vibration limiting means has an impact absorbing member which is provided for each of the pair of side walls to abut against the wiper blade when the wiper blade vibrates.

3. A wiper device according to claim 2, wherein the impact absorbing member is made of any one of rubber and resin.

4. A wiper device according to claim 1, wherein the wiper blade has a blade rubber which contacts the surface to be wiped, and a plurality of lever members which holds the blade rubber, and said vibration limiting means has a pair of side walls facing side walls of the plurality of lever members at an outer side of the levers in the transverse direction.

5. A wiper device according to claim 1, wherein said vibration limiting means is provided at the side of a rear end of the wiper blade in a longitudinal direction with respect to the portion where the wiper blade and the wiper arm are connected.

6. A wiper device according to claim 1, wherein the wiper arm has a main wiper arm fixed to the drive shaft, and a sub-wiper arm fixed to a second drive shaft of which an axial center is disposed at a position separated from that of the drive shaft and moving together with a reciprocating pivotal movement of the main wiper arm to limit the motion of the wiper blade.

7. A wiper device according to claim 6, wherein the main wiper arm is connected rotatably to the wiper blade at the connecting portion at the intermediate portion of the wiper blade in the longitudinal direction and the sub-wiper arm is connected rotatably to the wiper blade at a second connecting portion which is nearer to a rear end of the wiper blade in a longitudinal direction than the intermediate portion thereof.

8. A wiper device according to claim 7, wherein the connecting portion and the second connecting portion are connected to a stay and the wiper blade is connected to the wiper arm via the stay.

9. A wiper device according to claim 8, wherein the stay includes the vibration limiting means and also includes a damping portion having a substantially U-shaped cross-sectional configuration in the transverse direction thereof and includes a pair of side walls facing the wiper blade at both sides of the wiper blade in the transverse direction.

10. A wiper device according to claim 9, wherein the damping portion is formed along the longitudinal direction of the wiper blade.

11. A wiper device according to claim 8, wherein an impact absorbing member is provided to abut against the pair of side walls of the stay when the wiper blade vibrates.

12. A wiper device according to claim 8, wherein the stay has an aerodynamic member which utilizes air flow running along the surface to be wiped to cause a pressure difference and which converts the pressure difference to pressure for pressing said wiper blade against the surface to be wiped.

13. A wiper device according to claim 12, wherein the aerodynamic member is formed to extend from the connecting portion to a leading end of the wiper blade in the longitudinal direction.

14. A wiper device according to claim 1, wherein the relative vibration is limited in a predetermined clearance range between the wiper blade or the wiper arm, and said vibration limiting means.

15. A wiper device comprising a drive shaft which reciprocates pivotally, a main wiper arm fixed to the drive shaft and reciprocating pivotally together with the drive shaft, a sub-wiper arm which is fixed to a driven shaft of which an axial center is disposed at a position separate from that of the drive shaft and moves together with reciprocating pivotal movement of the main wiper arm, and a wiper blade which is connected to the main wiper arm at a connecting portion in an intermediate portion of the wiper blade in the longitudinal direction and is also connected to the sub-wiper arm at a rear end portion of the wiper blade in the longitudinal direction, said wiper blade being provided to wipe a surface to be wiped by reciprocating pivotal movement of the main wiper arm in such a manner that the motion of the wiper blade is limited by the sub-wiper arm, said wiper device further comprising:

vibration limiting means provided at any one of the wiper blade and the sub-wiper arm at a portion other than the connecting portion of the wiper blade and the main wiper arm, so as to limit relative vibration of the sub-wiper arm and the wiper blade during the reciprocating pivotal movement.

16. A wiper device according to claim 15, wherein said vibration limiting means has a pair of side walls which faces the wiper blade at both sides of the wiper blade in the transverse direction.

17. A wiper device according to claim 16, wherein said vibration limiting means has an impact absorbing member which is provided in each of the pair of side walls to abut against the wiper blade when the wiper blade vibrates.

18. A wiper device according to claim 15, wherein said vibration limiting means is pivotably provided in one of the wiper blade and the sub-wiper arm so that the relative vibration can be limited alternatively with respect to the other of the wiper blade and the sub-wiper arm.

19. A wiper device according to claim 18, wherein the relative vibration is limited in a predetermined clearance range between the wiper blade or the sub-wiper arm, and said vibration limiting means.

20. A wiper device according to claim 15, wherein the main wiper arm and the sub-wiper arm are connected via a stay to the wiper blade.

21. A wiper device according to claim 20, wherein the stay includes the vibration limiting means and also includes a damping portion having a substantially U-shaped cross-sectional configuration in the transverse direction thereof and includes a pair of side walls facing the wiper blade at both sides of the wiper blade in the transverse direction.

22. A wiper device according to claim 20, wherein the stay has an aerodynamic member which utilizes air flow running along the surface to be wiped to cause pressure difference and which converts the pressure difference to pressure for pressing said wiper blade against the surface to be wiped.

23. A wiper device according to claim 22, wherein the aerodynamic member is formed to extend from the connecting portion to a leading end of the wiper blade in the longitudinal direction.

\* \* \* \* \*